(12) United States Patent
Hillenaar et al.

(10) Patent No.: US 8,469,632 B2
(45) Date of Patent: Jun. 25, 2013

(54) VESSEL FOR LAYING A PIPELINE AND COMPRISING AN A AND R MEANS

(75) Inventors: Maikel Hillenaar, Leiderdorp (NL); Gerardus Cornelius van Grieken, Noordwijkerhout (NL)

(73) Assignee: Heerema Marine Contractors Nederland B.V., Leiden (NL)

(*) Notice: Subject to any disclaimer, the term of this patent is extended or adjusted under 35 U.S.C. 154(b) by 267 days.

(21) Appl. No.: 12/746,667

(22) PCT Filed: Dec. 21, 2007

(86) PCT No.: PCT/NL2007/000327
§ 371 (c)(1),
(2), (4) Date: Jun. 7, 2010

(87) PCT Pub. No.: WO2009/082191
PCT Pub. Date: Jul. 2, 2009

(65) Prior Publication Data
US 2010/0260552 A1    Oct. 14, 2010

(51) Int. Cl.
*F16L 1/12* (2006.01)
(52) U.S. Cl.
USPC .......................................................... 405/166
(58) Field of Classification Search
USPC ...................... 405/166; 114/61.1, 264, 265
See application file for complete search history.

(56) References Cited

U.S. PATENT DOCUMENTS

| 6,056,478 | A | 5/2000 | Martin et al. |
| 2002/0159839 | A1 | 10/2002 | Frijns et al. |
| 2003/0147699 | A1 | 8/2003 | Long et al. |

FOREIGN PATENT DOCUMENTS

| GB | 2 336 191 A | 10/1999 |
| WO | 00/05525 A2 | 2/2000 |
| WO | 2004/068012 A2 | 8/2004 |
| WO | WO 2004068012 A2 * | 8/2004 |
| WO | 2004/085898 A1 | 10/2004 |
| WO | WO 2005085692 A1 * | 9/2005 |
| WO | WO 2006089786 A1 * | 8/2006 |

* cited by examiner

*Primary Examiner* — David Bagnell
*Assistant Examiner* — Kyle Armstrong
(74) *Attorney, Agent, or Firm* — Hoffman & Baron, LLP

(57) ABSTRACT

A vessel (1) for laying a pipeline, the vessel comprising a hull structure (3) comprising one or more floaters (4), a tower (5) defining a firing line (6) when positioned in a pipelaying position, the tower (5) being pivotable relative to the hull structure (3) about a tower pivot axis (7), and an A & R means (8) for abandoning and/or recovering the pipeline, wherein the tower (5) is pivotable about said tower pivot axis (7) substantially independent from the A & R means (8) and the A & R means (8) is configured to operate while the tower (5) is pivoted about said tower pivot axis (7).

31 Claims, 7 Drawing Sheets

VESSEL FOR LAYING A PIPELINE AND COMPRISING AN A AND R MEANS

CROSS-REFERENCE TO RELATED APPLICATIONS

This application is the National Stage of International Application No. PCT/NL2007/000327, filed Dec. 21, 2007, the contents of which is incorporated by reference herein.

FIELD OF THE INVENTION

The invention relates to a vessel for laying a pipeline, the vessel comprising a hull structure comprising one or more floaters, a tower defining a firing line when positioned in a pipelaying position, the tower being pivotable relative to the hull structure about a tower pivot axis, and an A&R means for abandoning and/or recovering the pipeline. The firing line is the line along which the pipeline is lowered to a seabed. The tower positioned in the pipelaying position defines the firing line. During pipelaying, the pipeline leaves the tower along the firing line.

BACKGROUND OF THE INVENTION

Such a vessel is known from the prior art. During the laying of the pipeline the tower is positioned in an upright position, with an angle relative to the hull structure that is variable. If for one reason or another, the pipelaying operation has to be stopped, for instance when bad weather conditions are forecasted, the vessel has to be prepared for pipe abandonment. This means that the pipeline has to be abandoned from the vessel by positioning the pipeline on the seabed. Furthermore, the tower has to be pivotally lowered towards the hull structure and placed in a lowered position. The pipeline may remain connected to the vessel via for example a cable. Because of the high waves which occur during bad weather, the length of said cable must be such that it provides sufficient clearance between the vessel and the pipeline.

The known vessel abandons the pipeline by means of the A&R means which are provided in the tower. Said A&R means generally comprises reeling means with long cables. During the abandoning operation it is required that the tower remains in an upright position. After the pipeline is positioned on the seabed, the lowering of the tower towards the hull structure and in the lowered position can be started. Said preparation of the vessel for bad weather is a time consuming operation. This is also the case for the preparation of the vessel for resuming an operation, for instance after the weather conditions have improved. For this, the tower has first to be raised from the hull structure to an upright position. After that, the pipeline can be recovered by the A&R means.

This means that the preparation of the vessel for bad weather or for resuming an operation after bad weather is very time consuming. Due to this, costly operational time in which pipeline can be laid is lost.

Furthermore, due to the fact that the preparation of the vessel for bad weather is very time consuming, said preparation has to be started long before the bad weather is expected to arrive. The accuracy of a weather forecast highly depends on the time period in which said forecast is made. This means that a bad weather forecast which is made several hours before the actual arriving of the bad weather is far more accurate than a forecast made one day or more before the arrival of said bad weather. With the known vessel it often happens that due to the a wrong weather forecast, the vessel is taken out of operation and prepared for bad weather, while said bad weather at the end changes of course and does not arrive at the vessel location. Many hours of operational time often lost this way.

SUMMARY OF THE INVENTION

An object of the invention is to provide a vessel which allows a faster preparation of the vessel for bad weather or for operation after bad weather.

The object is achieved by that the tower is pivotable about said tower pivot axis substantially independent from the A&R means and the A&R means is configured to operate while the tower is pivoted about said tower pivot axis.

This has the following effects. For the preparation of the vessel for bad weather, the lowering of the tower does not have to wait until the pipeline is abandoned. For the preparation of the vessel for operation after bad weather, the recovering of the pipeline does not have to wait until the tower is raised in an upright position relative to the hull structure. Costly operational time is saved this way.

Furthermore, it will be clear that by reducing the required time to prepare the vessel for bad weather it is possible to make the decision for such a preparation on basis of a more accurate weather forecast. This means that the risk that the vessel is taken out of operation and prepared for bad weather while said bad weather does not arrive at the vessel is reduced.

In an embodiment of the vessel according the invention, the A&R means comprises a static construction substantially fixed in a specific position. The A&R means are positioned in a position suitable for abandoning or recovering the pipeline, while the tower is pivoted.

In a further embodiment of the vessel according the invention, the A&R means is movable relative to the hull structure and substantially independent of the tower. The A&R means may be pivotable relative to the hull structure about an A&R pivot axis and substantially independent of the tower. The A&R pivot axis may extend substantially parallel with the tower pivot axis. The tower pivot axis and the A&R pivot axis may extend substantial perpendicular to the firing line of the tower. The A&R pivot axis may substantially coincide with the tower pivot axis. The pivotal movement of the tower may define a pivot plane and the A&R means may be pivotable in said pivot plane. Each of these configurations provides a practical and/or constructional advantage.

In another embodiment of the vessel according the invention, the A&R means is configured such that the A&R means is movable between a position in the firing line and a position outside the firing line. When positioned in the firing line, the A&R means may advantageously be used for abandoning and/or recovering the pipeline. When positioned outside the firing line, the A&R means allow the passage of a large structure (like an inline structure) along the firing line. Additionally, when positioned outside the firing line the A&R means may be used in a different function than A&R of a pipeline.

In an embodiment of the vessel according the invention, the vessel comprises a hang off means for hanging off the pipeline, wherein the tower is pivotable independent of the hang off means. The hang off means may for example comprise a hang off table, one or more friction clamps or one or more tensioners. The hang off means may be movable relative to the hull structure and substantially independent of the tower. The hang off means may be pivotable relative to the hull structure about a hang off pivot axis and substantially independent of the tower. The hang off pivot axis may extend substantially parallel with the tower pivot axis. The hang off pivot axis may extend substantially perpendicular to the firing line of the tower. The hang off pivot axis may substantially coincide with the tower pivot axis. The pivotal movement of the tower may define a pivot plane and the hang off means may be pivotable in said pivot plane. Each of these configurations provides a practical and/or constructional advantage.

In a further embodiment of the vessel according the invention, the hang off means is configured such that the hang off means is movable between a position in the firing line and a position outside the firing line. When positioned in the firing line, the hang off means may advantageous be used for hanging off the pipeline. When positioned outside the firing line, the hang off means allow the passage of a large structure (like an in-line-structure) along the firing line.

In another embodiment of the vessel according the invention, the vessel comprises a line up means for lining up the pipeline, wherein the line up means is movable substantially independent of the tower. The line up means may be configured such that the line up means is movable between a position in the firing line and a position outside the firing line. When positioned in the firing line, the line up means may advantageous be used for lining up the pipeline along the firing line. When positioned outside the firing line, the line up means allow the passage of a large structure (like an inline structure) along the firing line. The line up means may be pivotable about a line up pivot axis. The line up means may be pivotable connected to the A&R means.

In an embodiment of the vessel according the invention, the A&R means comprises an U-shaped frame which is at two ends thereof pivotable connected to the vessel. The tower may comprise a U-shaped base which is at two ends thereof pivotable connected to the vessel and wherein the U-shaped frame of the A&R means in may be located inside the U-shaped base of the tower.

In a further embodiment of the vessel according the invention, the vessel comprises a workstation, which is movable between a position in which the work station is located in the firing line to a second position in which the work station is positioned outside the firing line.

The invention also relates to a method of laying a pipeline with a vessel comprising a hull structure comprising one or more floaters, a tower defining a firing line when positioned in a pipelaying position, an A&R means for abandoning and recovering the pipeline, which method comprises the abandoning and/or recovering of the pipeline by means of the A&R means while pivotally moving the tower about a tower pivot axis and relative to the hull structure. The method may comprise the step in which the tower is pivotally lowered to the hull structure while the pipeline is abandoned and/or the step in which the tower is pivotally raised from the hull structure while the pipeline is recovered.

The invention further relates to a method of laying a pipeline with a vessel according to the invention, comprising the steps of positioning the A&R means in a hoisting position, —hoisting an item with the A&R means, and moving the A&R means such that the hoisted item is positioned in the firing line.

The A&R means may be located outside the firing line when the item is positioned in the firing line. The hang off means may be located outside the firing line when the item is positioned in the firing line. The line up means may be located outside the firing line when the item is positioned in the firing line. This is advantageous when the item is a large structure (like an inline structure).

BRIEF DESCRIPTION OF THE DRAWINGS

The invention will be explained in details with reference to the accompanying drawings wherein.

DETAILED DESCRIPTION OF THE PREFERRED EMBODIMENTS

Figure 1A:
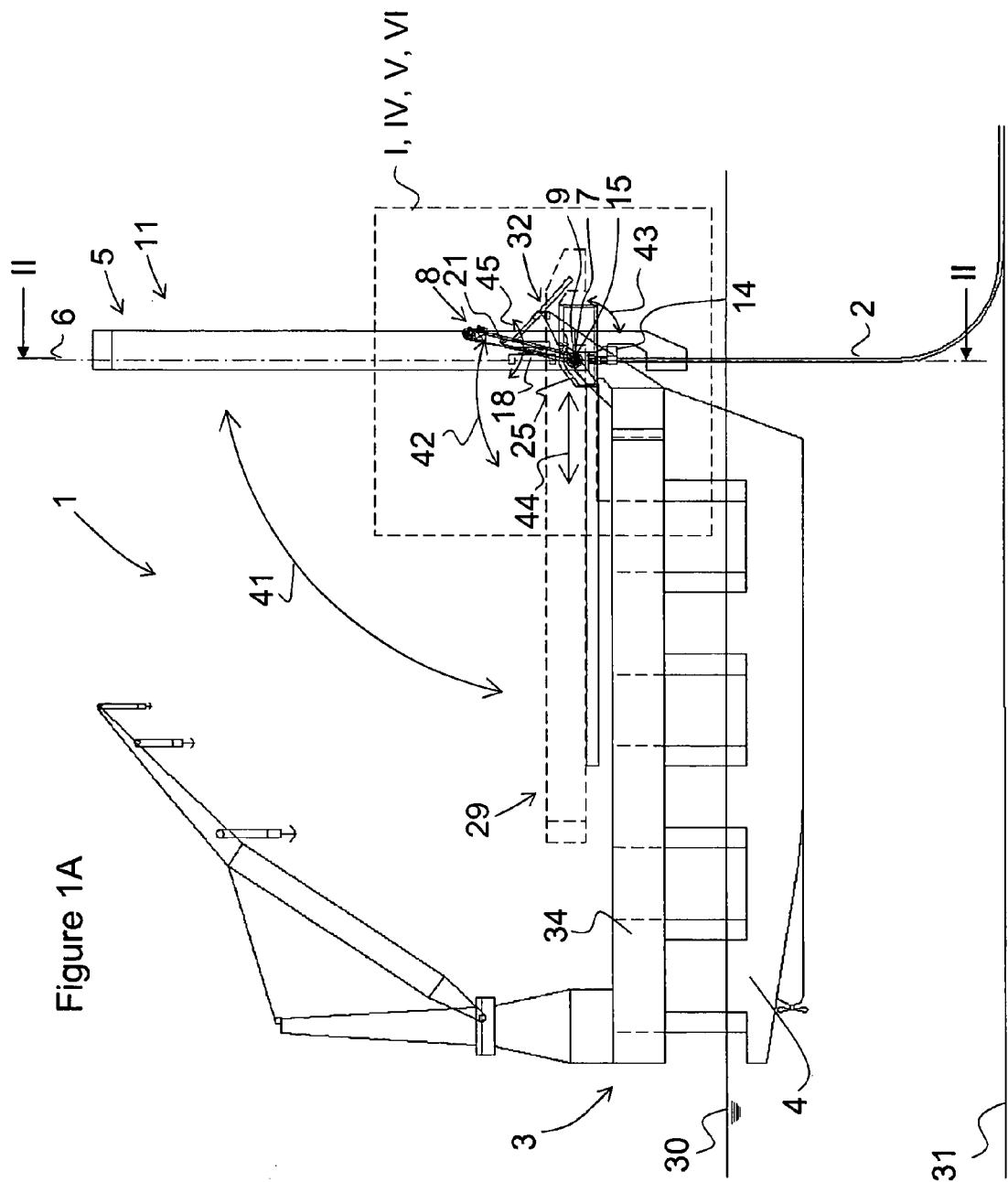
FIG. 1A schematically shows a side view of an embodiment of the vessel according the invention during pipelaying.

FIGS. 1A and/or 1B show an embodiment of a vessel according the invention, the water line 30 and the sea bed 31. The vessel 1 is used for the laying of a pipeline 2. The vessel 1 comprises a hull structure 3 with two floaters 4, and a deck 34 positioned on top of those floaters 4. A tower 5 is positioned at the bow of vessel 1. The tower 5 is positioned in a pipelaying position 11 in which it defines a firing line 6 along which the pipeline 2 is laid. During pipelaying, the pipeline 2 is constructed from pipe sections and leaves the tower 5 along the firing line 6. The pipelaying position 11 of the tower 5 is determined by the pipe departure angle. The tower 5 is pivotable connected to the vessel 1 such that the tower 5 can pivot relative to the hull structure 3 about a tower pivot axis 7. The pivot movement of the tower 5 is indicated by arrow 41. The tower 5 may be lowered from said pipelaying position to the deck 34 into a laid down position 29. Said pivot movement of the tower 5 defines a pivot plane (10 of FIG. 2) in which the tower 5 is pivotable.

The vessel 1 furthermore, comprises A&R means 8 which is pivotable about an A&R pivot axis 9. The tower 5 is pivotable independently from the A&R means 8. The A&R means is configured to operate while the tower 5 is pivoted about the tower pivot axis 7. Said operation of the A&R means may be the abandoning and/or recovery of the pipeline 2. The A&R means 8 is pivotable relative to the hull structure 3 and independent of the tower 5. The pivot movement of the A&R means 8 is indicated by arrow 42. The A&R means 8 is positioned behind the firing line 6. The position of the A&R means 8 is adjustable by means of an A&R adjuster 32.

The vessel 1 further comprises a hang off means 14 for hanging of the pipeline 2. The tower 5 and the hang off means 14 are pivotable independently from each other. The hang off means 14 is pivotable relative to the hull structure 3 about a hang off pivot axis 15. The hang off means 14 is in this figure positioned in the firing line 6. The pivotable movement of the hang off means 14 is indicated by arrow 43.

Line up means 18 are connected to the A&R means 8. Said line up means 18 are pivotable about a line up pivot axis 21. Said pivot movement is indicated by arrow 45. The line up means 18 serve to line up a pipe section positioned in the tower along the firing line 6. In this figure, the line up means is positioned in the firing line 6.

A workstation 25 is provided for giving shelter to persons working on the pipeline 2. Said workstation 25 is arranged such that it is movable as by arrow 44. In this figure the workstation 25 is positioned in the firing line 6. It may be moved along said arrow 44 to a position outside the firing line.

Due to the specific configuration of the vessel 1, it is possible to abandon or recover the pipeline 2 with the A&R means while pivotally moving the tower 5 about the tower pivot axis 7 and relative to the hull structure 3. Because of this it is possible to pivotally lower the tower 5 to the deck 34 while the pipeline 2 is abandoned. It is also possible to pivotally raise the tower 5 from the deck 34 while the pipeline 2 is recovered.

Figure 1B:
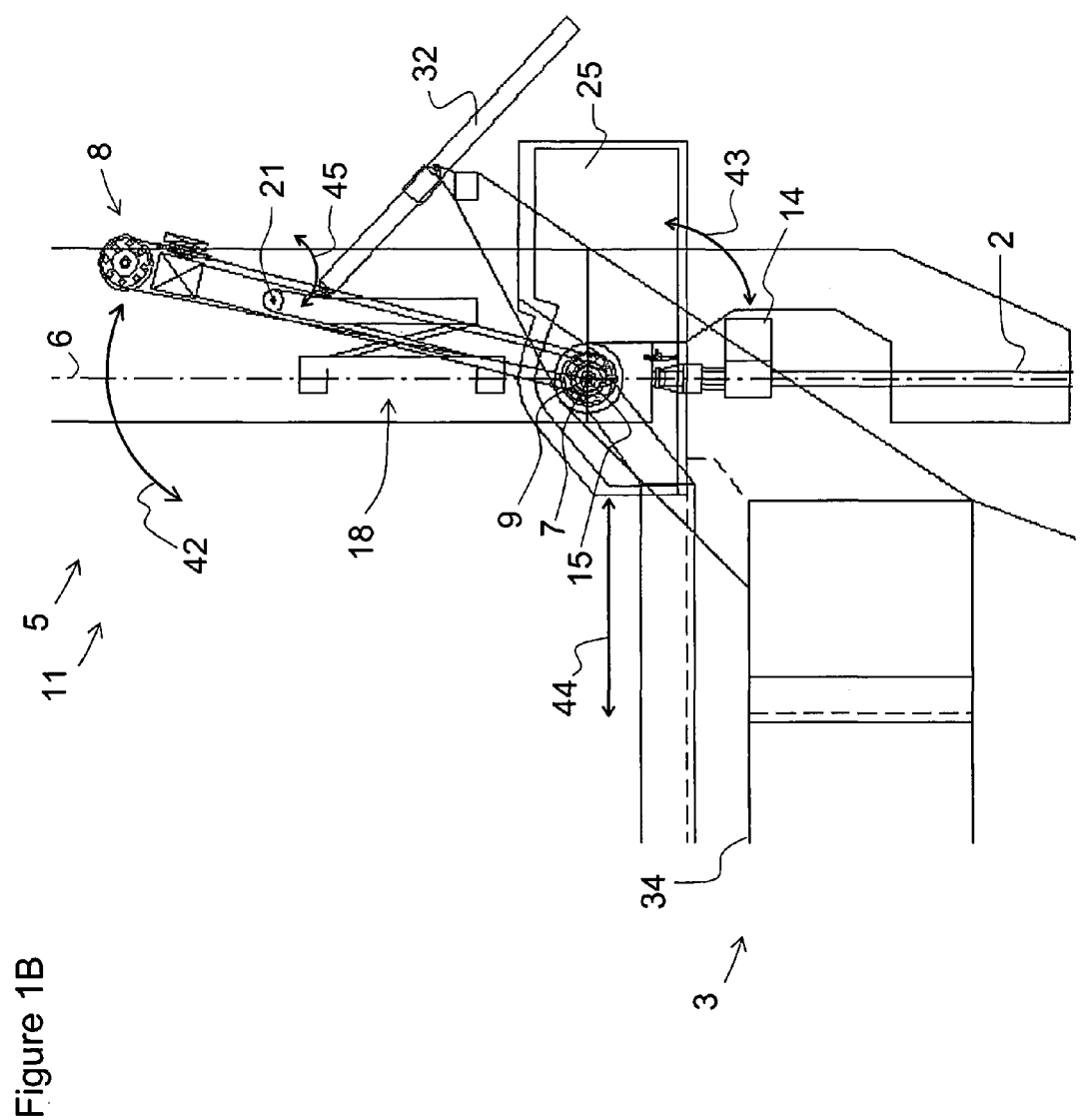
FIG. 1B schematically shows an enlarged view of part I of FIG. 1A during pipelaying.
Figure 2:
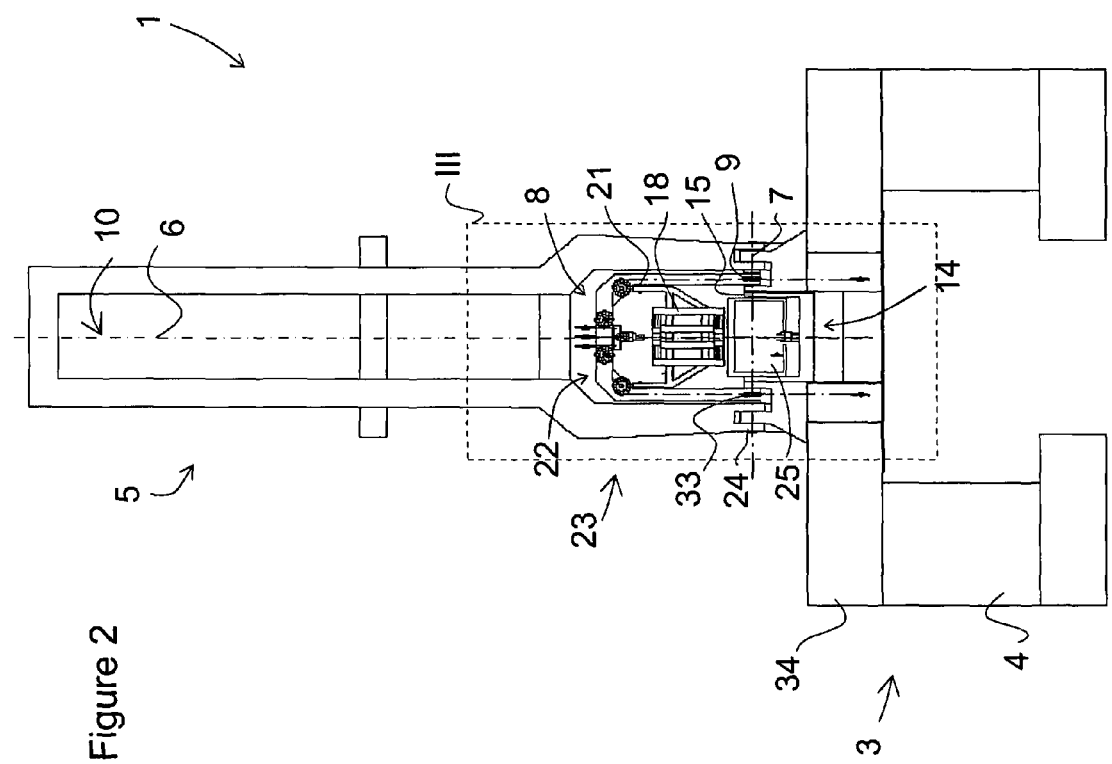
FIG. 2 schematically shows a view in cross section along the line II-II of FIG. 1.

FIG. 2 shows a view in cross section of the vessel of FIG. 1. The pivot plane 10 in which the tower 5 is pivotable is indicated. The tower 5 comprises an U-shaped base 23. Said U-shaped base 23 is with two ends 24 thereof pivotable connected to the vessel 1.

The A&R means 8 comprise an U-shape frame 22 which is with two ends 33 thereof pivotable connected to the vessel 1. The U-shaped frame 22 of the A&R means 8 is located inside the U-shapes base 23 of the tower 5. The line up means 18 are pivotable connected to the A&R means 8. The tower pivot axis 7, A&R pivot axis 9 and hang off pivot axis 15 coincide.

Figure 3:
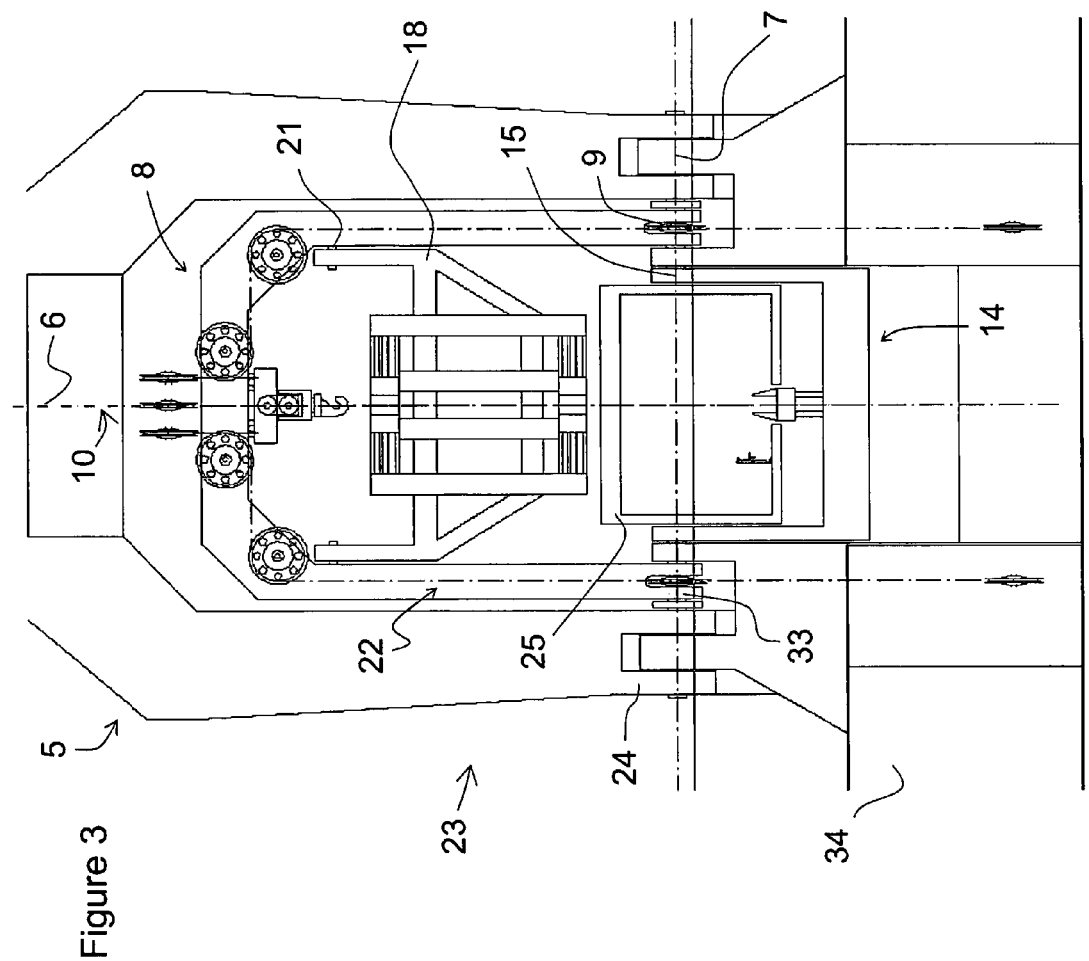
FIG. 3 shows an enlarged view of part III of FIG. 2.

FIG. 3 shows in an enlarged view part III of FIG. 2. The tower pivot axis 7, A&R pivot axis 9 and pivot axis 15 are clearly shown is this figure. The tower 5, A&R means 8 and hang off means 14 can all pivot independently from each other. Although in the drawing all three pivot axes coincide, relatively small height differences may be applied. If the A&R means 8 is pivotable connected to the tower such that the A&R pivot axis 9 is located at a relatively small distance above the tower pivot axis 7 (seen from the view of FIG. 3), then the A&R means 8 is substantially movable independent from the tower 5 even though the A&R means 8 may be subjected to a small displacement when the tower 5 is pivoted. The same applies to the hang off means 14 and the line up means 18.

Figure 4:
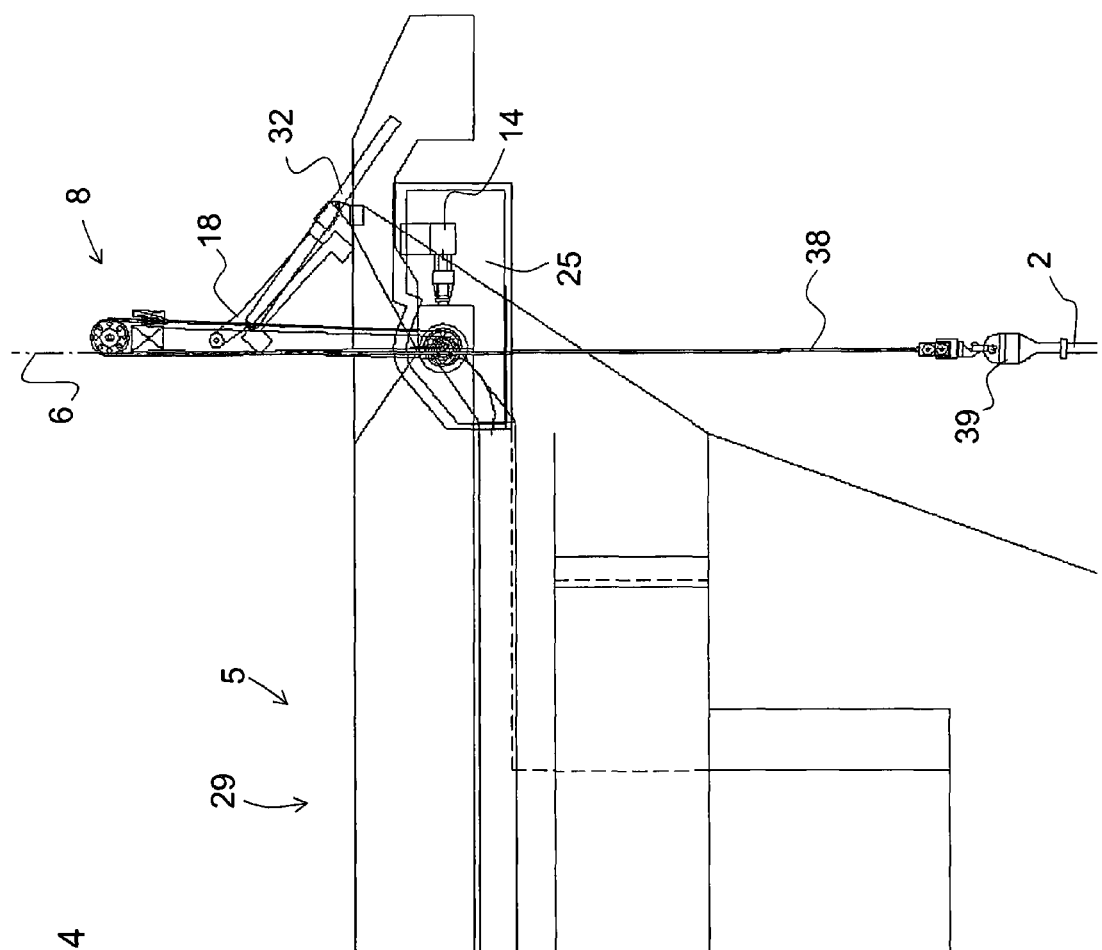
FIG. 4 schematically shows the vessel of FIG. 1 during the abandoning of the pipeline.

FIG. 4 shows an enlarged view of part IV of FIG. 1 during an abandonment or recovery operation. The tower 5 is shown in the laid down position 29 but may be raised to the pipelaying position during the A&R operation. The A&R means 8 is positioned in the firing line 6 such that the A&R wire 38 can be lowered or raised following the firing line 6. To enable the A&R operation, the line up means 18 are positioned outside the firing line 6. Also the hang off means 14 are positioned outside the firing line 6. During a recovery operation, the hang off means 14 can be rotated into the firing line 6 after A&R head 39, which is connected to the end of pipeline 2, is lifted above said hang off means 14 positioned in the firing line 6.

Figure 5:
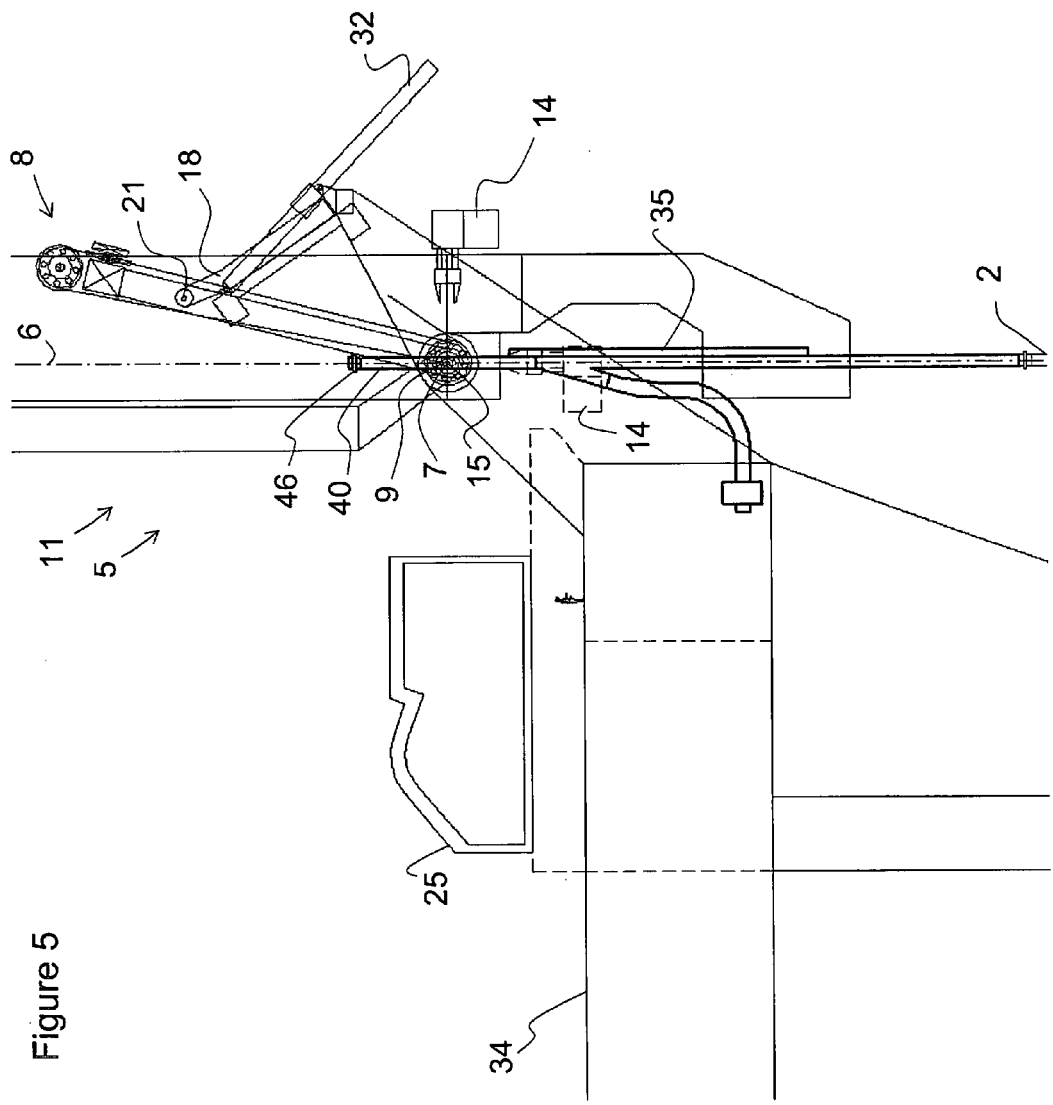
FIG. 5 shows an enlarged view of part V of FIG. 1 during the passage of an inline structure and FIG. 6 shows an enlarged view of part VI of FIG. 1 during the hoisting of an item from the deck of the hull structure by the A&R means.

FIG. 5 shows in an enlarged view part V of FIG. 1 while an inline structure 35, is positioned along the firing line 6. The A&R means 8, hang off means 17, workstation 25 and line up means 18 are positioned outside the firing line 6. Because of this, space is created so that the inline structure 35 can be positioned along the firing line 6 and lowered, for instance with a travelling block (not shown), such that inline structure 35 passes the A&R means 8, hang off means 14, workstation 25 and line up means 18. After passage of the bulky part of the inline structure 35 the collar 46 on the stem 40 of the inline structure can be positioned such hang off means 14 can be pivoted in the firing line 6 and under said collar 46 (shown in dotted lines). Collar 46 can then be hung off on said hang off means 14 positioned in the firing line 6. The workstation 25 can be moved in the firing line 6 and the line up means 18 can be pivoted into said firing line in order to receive additional pipe sections. In the situation that a pipeline end termination (PLET) is used, the A&R means 8 can be pivoted into the firing line 6 for connection of the A&R cable 38 to the PLET for laydown of the completed pipeline on the seabed 31.

Figure 6:
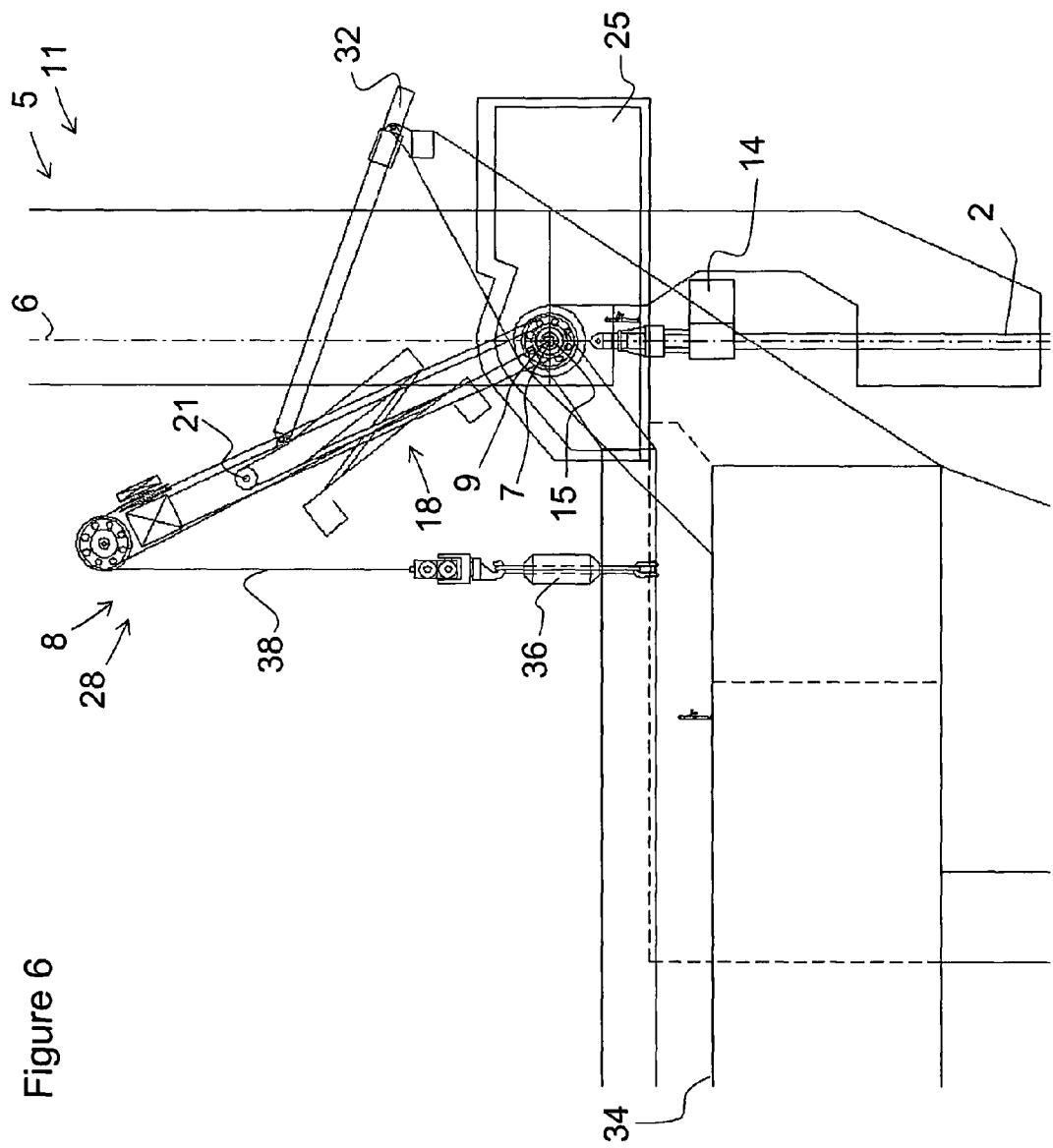

FIG. 6 shows an enlarged view of part VI of FIG. 1 while an item 36 is hoisted from the deck 34. The A&R means 8 is positioned in a hoisting position 28. In said hoisting position the A&R means 8 is positioned between the firing line 6 and the deck 34 of the hull structure 3. The workstation 25 is positioned in the firing line 6. The line up means 18 are positioned adjacent to the frame of the A&R means 8. This way, the item 36 can be hoisted by the A&R means 8 and subsequently moved by pivotally moving the A&R means 8. It is possible to pivot the A&R means 8 such that the item 36 is positioned in the firing line 6 or in a position past the firing line 6.

It will be clear to the person skilled in the art that many different embodiments are possible without departing from the scope of the invention.

The invention claimed is:

1. A vessel for laying a pipeline, the vessel comprising:
a hull structure comprising one or more floaters;
a tower defining a firing line when positioned in a pipelaying position, the tower being pivotable relative to the hull structure about a tower pivot axis; and
an A&R means for abandoning and/or recovering the pipeline, which A&R means comprises an A&R wire to lower and raise the pipeline relative to the hull structure;
wherein the tower is pivotable about said tower pivot axis independently from the A&R means; and
wherein the A&R means is configured to move said pipeline along said firing line while the tower is being pivoted or has been pivoted about said tower pivot axis in a position different than the pipelaying position.

2. The vessel according to claim 1, wherein the A&R means is movable relative to the hull structure and independently of the tower.

3. The vessel according to claim 1, wherein the A&R means is pivotable relative to the hull structure about an A&R pivot axis and independently of the tower.

4. The vessel according to claim 3, wherein the A&R pivot axis extends parallel with the tower pivot axis.

5. The vessel according to claim 4, wherein the A&R means comprises a U-shaped frame which is at two ends thereof pivotally connected to the vessel.

6. The vessel according to claim 5, wherein the tower comprises a U-shaped base which is at two ends thereof pivotally connected to the vessel and wherein the U-shaped frame of the A&R means is located inside the U-shaped base of the tower.

7. The vessel according to claim 3, wherein the tower pivot axis and the A&R pivot axis extend perpendicular to the firing line of the tower.

8. The vessel according to claim 3, wherein the A&R pivot axis coincides with the tower pivot axis.

9. The vessel according to claim 3, wherein the pivotal movement of the tower defines a pivot plane and the A&R means is pivotable in said pivot plane.

10. The vessel according to claim 1, wherein the A&R means is configured such that the A&R means is movable between a position in the firing line and a position outside the firing line.

11. The vessel according to claim 1, wherein the vessel comprises a hang off means for hanging off the pipeline, wherein the tower is pivotable independently of the hang off means.

12. The vessel according to claim 11, wherein the hang off means is movable relative to the hull structure and independently of the tower.

13. The vessel according to claim 11, wherein the hang off means is pivotable relative to the hull structure about a hang off pivot axis independently of the tower.

14. The vessel according to claim 13, wherein the hang off pivot axis extends parallel with the tower pivot axis.

15. The vessel according to claim 13, wherein the hang off pivot axis extends perpendicular to the firing line of the tower.

16. The vessel according to claim 13, wherein the hang off pivot axis coincides with the tower pivot axis.

17. The vessel according to claim 13, wherein the pivotal movement of the tower defines a pivot plane and the hang off means is pivotable in said pivot plane.

18. The vessel according to claim 11, wherein the hang off means is configured such that the hang off means is movable between a position in the firing line and a position outside the firing line.

19. The vessel according to claim 1, wherein the vessel comprises a line up means for lining up the pipeline and said line up means is movable relative to the hull structure independently of the tower.

20. The vessel according to claim 19, wherein the line up means is configured such that the line up means is movable between a position in the firing line and a position outside the firing line.

21. The vessel according to claim 19, wherein the line up means is pivotable about a line up pivot axis.

22. The vessel according to claim 21, wherein the line up means are pivotally connected to the A&R means.

23. The vessel according to claim 21 wherein the line up means are releasably connected to the hang off means.

24. The vessel according to claim 1, wherein the vessel comprises a workstation, which is movable between a position in which the work station is located in the firing line to a second position in which the work station is positioned outside the firing line.

25. A method of laying a pipeline with a vessel;
the vessel comprising:
   a hull structure comprising one or more floaters;
   a tower defining a firing line when positioned in a pipelaying position; and
   an A&R means for abandoning and recovering the pipeline, which A&R means comprises an A&R wire to lower and raise the pipeline relative to the hull structure;
which method comprises:
abandoning and/or recovering of the pipeline by means of the A&R means while pivotally moving the tower about a tower pivot axis and relative to the hull structure; and
operating the A&R means to move said pipeline along said firing line while the tower is being pivoted or has been pivoted about said tower pivot axis in a position different than the pipelaying position.

26. The method according to claim 25, wherein the tower is pivotally lowered to the hull structure while the pipeline is abandoned.

27. The method according to claim 25, wherein the tower is pivotally raised from the hull structure while the pipeline is recovered.

28. A method of laying a pipeline with a vessel, comprising:
providing the vessel according to claim 2;
positioning the A&R means in a hoisting position;
hoisting an item with the A&R means; and
moving the A&R means such that the hoisted item is positioned in the firing line.

29. The method according to claim 28, wherein the A&R means, when viewed in a direction of the tower pivot axis, is are located outside the firing line when the item is positioned in the firing line.

30. The method according to claim 28, wherein a hang off means, when viewed in a direction of the tower pivot axis, is located outside the firing line when the item is positioned in the firing line.

31. The method according to claim 28, wherein a line up means, when viewed in a direction of the tower pivot axis, is located outside the firing line when the item is positioned in the firing line.

* * * * *